Dec. 25, 1934.  C. B. SCHAFER  1,985,520
METHOD AND APPARATUS FOR USE IN THE CUTTING OF LAMINATED GLASS
Filed July 24, 1930  2 Sheets-Sheet 1
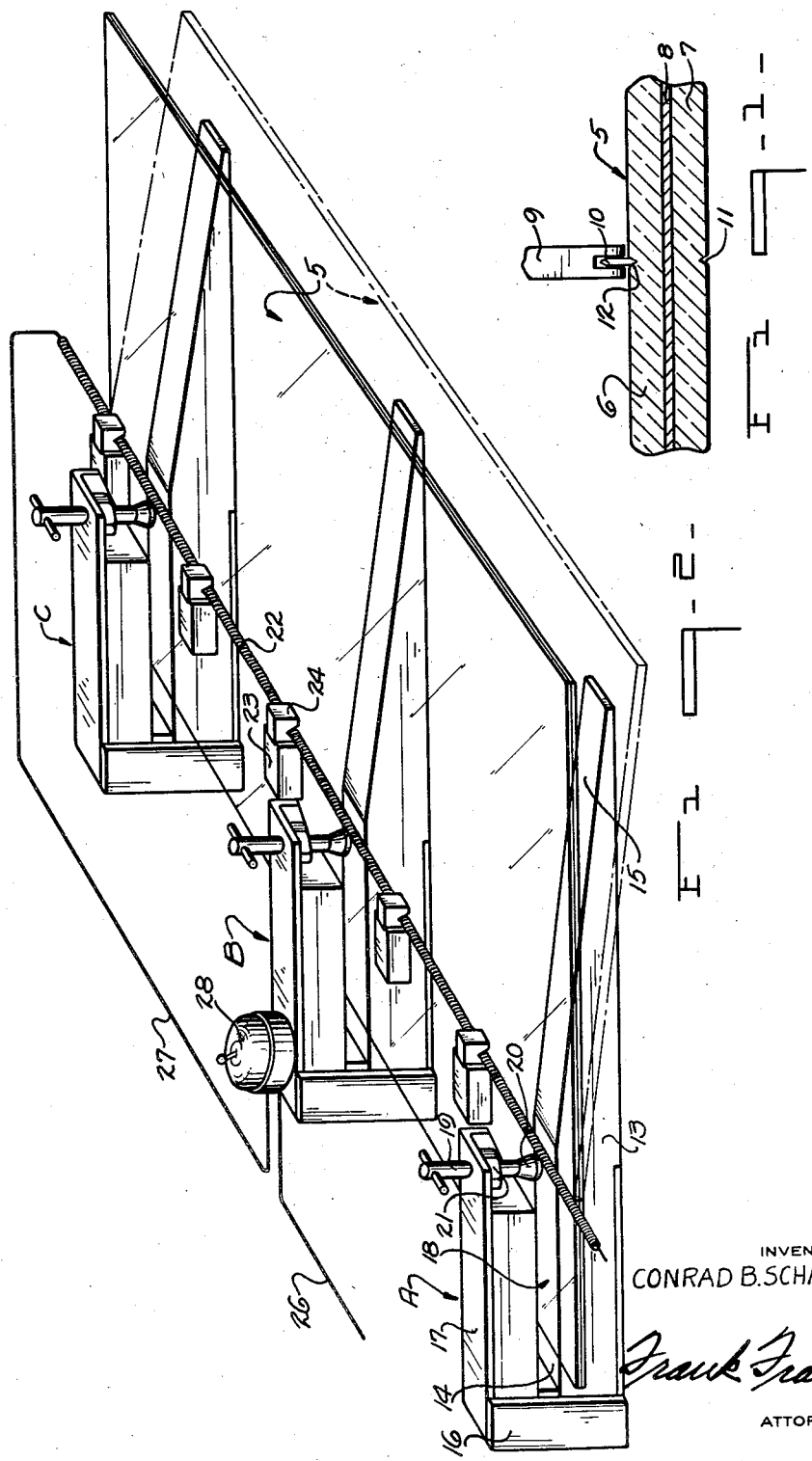
INVENTOR
CONRAD B. SCHAFER
Frank Fraser
ATTORNEY Dec. 25, 1934.     C. B. SCHAFER     1,985,520
METHOD AND APPARATUS FOR USE IN THE CUTTING OF LAMINATED GLASS
Filed July 24, 1930     2 Sheets-Sheet 2
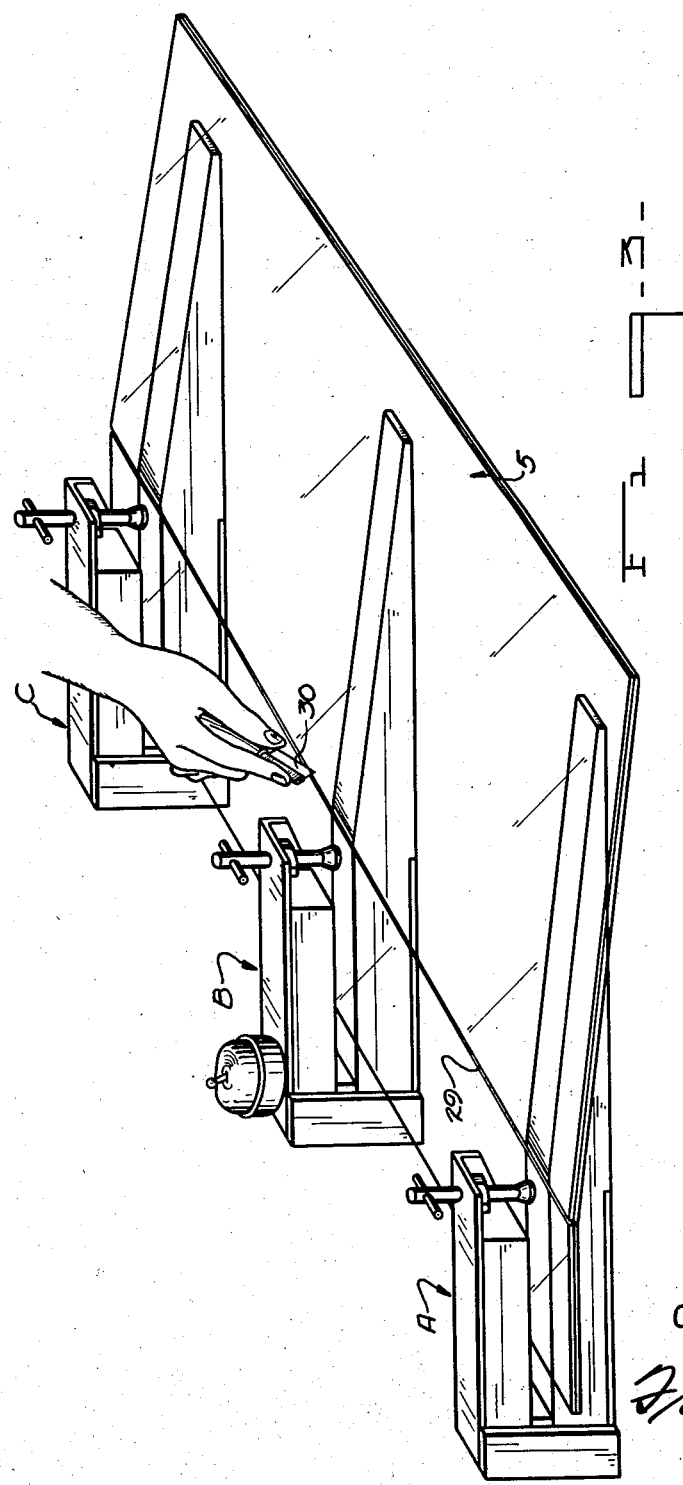
INVENTOR
CONRAD B. SCHAFER
ATTORNEY Patented Dec. 25, 1934

1,985,520

UNITED STATES PATENT OFFICE 1,985,520

METHOD AND APPARATUS FOR USE IN THE CUTTING OF LAMINATED GLASS

Conrad B. Schafer, Toledo, Ohio, assignor to Libbey-Owens-Ford Glass Company, Toledo, Ohio, a corporation of Ohio Application July 24, 1930, Serial No. 470,350

12 Claims. (Cl. 49—50)

The present invention relates to a method and apparatus for use in the cutting of sheets of laminated glass, which glass usually comprises two or more sheets of glass and one or more sheets of a suitable non-brittle material interposed therebetween and united thereto to form a composite structure.

This invention is particularly adapted, although of course not restricted, for use in the cutting of laminated sheet glass in accordance with the general process disclosed in the patent to S. J. Lewis, 1,731,820, issued October 15, 1929, and contemplates the cutting of a sheet of laminated glass by first scoring the sheet on opposite sides, heating the sheet in proximity to the score lines, separating the glass sheets along the score lines, and then severing the innermost non-brittle sheet by means of a sharp implement or the like.

An important object of the invention lies in the provision of an improved method and means for effecting the desired separation of the glass sheets along the score lines whereby access may be had to the non-brittle sheet to permit the separation thereof.

Another object of the invention is the provision of an improved method and means whereby the separation of the glass sheets along the score lines may be readily and conveniently effected in a manner to promote rapid and accurate cutting of the glass.

Another object of the invention resides in the provision of a method and apparatus wherein the laminated sheet, after being scored and cracked along the score lines, is secured in a substantially horizontal position by a plurality of clamping elements engaging the sheet to one side only of the score lines, the laminated sheet being then heated along said score lines in a manner that the unclamped portion thereof at the opposite side of the score lines will be permitted to bend downwardly by gravity incident to the heating and softening of the non-brittle material and thereby cause a separation of the glass along the score lines so that access may be had to the non-brittle sheet to permit the cutting thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a sectional view of a portion of a sheet of laminated glass illustrating diagrammatically the scoring of the glass sheets, Fig. 2 is a perspective view of apparatus provided by the present invention, showing the heating of the laminated sheet, and Fig. 3 is a similar view showing the cutting of the non-brittle material.

In Fig. 1 of the drawings is shown a sheet of laminated glass 5 comprising the two outer sheets of glass 6 and 7 between which is interposed a sheet 8 of some suitable non-brittle material united to the glass sheets to provide a composite structure. This invention relates in no way to the formation of the sheet nor to the particular materials used therein. In cutting the laminated sheet 5, both sides thereof are first scored with the two score lines being opposite or in alignment with one another. This may be effected, for example, by means of a scoring tool 9 including a hardened steel wheel 10 which, when drawn across the glass sheets 6 and 7, forms the score lines 11 and 12 opposite one another. Although it is preferred to use an ordinary dull steel wheel cutter in scoring the glass sheets, a diamond cutter could of course be used, if desired.

After the laminated sheet has been scored in the above manner, the glass sheets are cracked along the score lines 11 and 12 and either one or both of the glass sheets separated at the score lines to permit access to the non-brittle sheet. After the non-brittle material has been stretched so that a slight space is had between the separated pieces of glass, a suitable cutting implement is passed through the space to sever the non-brittle sheet, thereby completing the cutting operation. The present invention concerns particularly the provision of a novel method and means for effecting the desired separation of the glass along the score lines to facilitate and expedite the cutting of the non-brittle material.

The apparatus herein provided for effecting the separation of the glass along the score lines comprises a plurality of clamping members A, B, C etc. and, while only three of such members have been shown, it will be appreciated that any desired number may be used, dependent for example upon the size of sheet to be cut. Inasmuch as all of the clamping members are of the same construction, a detailed description of only one will be given.

Each clamping member comprises a substantially rectangular base 13 having at one end an upper horizontal sheet supporting surface 14 from which extends an inclined surface 15, the length of the inclined surface being preferably relatively greater than the length of the horizontal surface, with the degree of inclination thereof being varied as desired. Secured to the rear end of the base 13 are uprights or end pieces 16 carrying the forwardly directed horizontal top portion 17 which is positioned directly above base 13, being parallel with the horizontal surface 14 but spaced therefrom to provide a slot 18 therebetween. Threaded downwardly through the top portion 17 adjacent the forward end thereof is a clamp bolt 19 provided with a clamping head 20 at its lower end, the said bolt being also threaded through a nut 21.

In accordance with the present invention, the glass sheets are first scored in the manner illustrated in Fig. 1 and then broken along the score lines, after which the laminated sheet is positioned and secured in the manner shown in Fig. 2. In other words, the desired number of clamping members are first positioned side by side in parallel relation with respect to one another after which the laminated sheet is inserted within the slots 18 between the top and bottom portions 17 and 13 respectively so that a portion of the sheet rests upon the horizontal surfaces 14 of the base portions 13. The bolts 19 are then threaded downwardly until the heads 20 thereof engage the laminated sheet and firmly clamp it in a fixed position. The sheet is preferably so positioned that the smaller portion thereof only at one side of the score lines will be clamped, while the major portion of the sheet will extend forwardly over the inclined surfaces 15 of the base portions.

After the laminated sheet has been properly secured in position, an electric heating coil 22 is placed upon the uppermost sheet of glass directly over the crack therein, said coil being held in position by a plurality of locaters 23, said locaters having heads 24 provided with grooves which fit over the coil and serve to hold it in position. The coil locaters are preferably positioned as illustrated with the longest part on the smallest piece of glass or, otherwise stated, that piece which is clamped in place. These locaters are removable so that the coil can be curved to follow the score line and there should be a sufficient number of locaters used at all times to keep the heating coil centrally of the crack in the glass. The coil 22 may be connected with a suitable source of energy through wires 26 and 27 and a switch 28, which switch may or may not be carried by one of the clamping members. After the coil has been properly positioned, the switch is turned on and the electric current passing through the heating coil will cause a heating of the glass sheets and the sheet of non-brittle material. Upon heating of the non-brittle material, it will become softened and, as it softens, the larger unclamped portion of the glass will gradually bend downwardly, due to its own weight, to the position illustrated by the broken lines in Fig. 2, where it will be supported upon the inclined surfaces 15. When this is done, the non-brittle material will of course be stretched so as to open up a gap 29 between the glass to permit the insertion of a cutting tool. The switch is then turned off, the heating coil and locaters removed, and the non-brittle material severed by inserting within the gap a suitable cutting implement 30 such as that illustrated in Fig. 3.

While as set forth above, the glass can be permitted to bend downwardly by its own weight as the non-brittle material becomes softened, yet it will be apparent that the operator can bend the glass downwardly by exerting a gentle pressure upon the unclamped portion of the sheet. However, he should be careful not to raise the glass upwardly as this may cause chipping.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the cutting of laminated sheets of glass, a plurality of members, each including a base having a horizontal surface and an inclined surface, means carried by said members and adapted to engage the laminated sheet at one side only of the score lines subsequent to the scoring and breaking of the glass sheets for securing that portion of the laminated sheet in a fixed position upon the horizontal surfaces, that portion of the sheet at the opposite side of the score lines being unsecured and overlying said inclined surfaces, and means for heating the laminated sheet to cause the unsecured portion of said sheet to bend downwardly and rest upon the inclined surfaces.

2. In apparatus for use in the cutting of laminated sheets of glass, a plurality of members, each including a base having a horizontal surface, means adapted to engage the laminated sheet at one side only of the score lines subsequent to the scoring and breaking of the glass sheets for securing that portion of said sheet in a fixed position upon the horizontal surfaces, while that portion of the sheet at the opposite side of the score lines is left unsupported, each base including a portion extending beneath the unsupported portion of the sheet and having an inclined upper surface, and means for heating the laminated sheet to cause the unsupported portion of the sheet to bend downwardly and rest upon said inclined surfaces.

3. In apparatus for use in the cutting of laminated sheets of glass, a plurality of clamping members, each including a base portion having a horizontal surface and an inclined surface, vertical end members secured to the base at the end thereof remote from the inclined surface, a forwardly directed top carried by the end members, and clamping elements carried by the tops for securing the laminated sheet in a fixed position upon the horizontal surfaces so that a portion of said sheet overlies the inclined surfaces.

4. In apparatus for use in the cutting of laminated sheets of glass, a plurality of clamping members, each including a base portion having a horizontal surface and an inclined surface, vertical end members secured to the base at the end thereof remote from the inclined surface, a forwardly directed top carried by the end members, clamping elements carried by the tops for securing the laminated sheet in a fixed position upon the horizontal surfaces so that a portion of said sheet overlies the inclined surfaces, and means for heating the sheet in a manner to cause the unsupported portion to bend downwardly and rest upon said inclined surfaces.

5. A clamping member for use in the cutting of laminated sheet glass, including a base having a horizontal upper surface and an inclined upper surface extending from said horizontal surface, vertical end members secured to the base at the end thereof remote from the inclined surface, a forwardly directed top carried by the end members, said top being positioned directly above and parallel with but spaced from said horizontal surface of the base, and a clamping element carried by said top.

6. The method of cutting laminated sheets of glass, including two sheets of glass and an interposed sheet of non-brittle material, which consists in first scoring the glass sheets, breaking said sheets along the score lines, securing the laminated sheet in a substantially horizontal position by fixedly securing that portion of the sheet at one side only of the score lines, in heating the laminated sheet to cause a softening of the non-brittle material so as to cause the unsupported portion of the sheet to bend downwardly by its own weight to provide a gap between the glass at the score lines, and in then completely severing the non-brittle material.

7. The method of cutting laminated sheets of glass, including two sheets of glass and an interposed sheet of non-brittle material, which consists in first scoring the glass sheets, breaking said sheets along the score lines, securing the laminated sheet in a substantially horizontal position by fixedly securing that portion of the sheet at one side only of the score lines, in heating the laminated sheet along the score lines to cause a softening of the non-brittle material so as to cause the unsupported portion of the sheet to bend downwardly by its own weight to provide a gap between the glass at the score line, in limiting the downward bending movement of the unsecured portion of the sheet and maintaining it in an inclined position, and in then completely severing the non-brittle material.

8. The method of cutting laminated sheets of glass, including two sheets of glass and an interposed sheet of non-brittle material, which consists in first scoring the glass sheets, breaking said sheets along the score lines, securing the laminated sheet in a substantially horizontal position by fixedly securing that portion of the sheet at one side only of the score lines, in heating the laminated sheet along the score lines to cause a softening of the non-brittle material so as to cause the unsupported portion of the sheet to bend downwardly by its own weight to provide a gap between the glass at the score line, in limiting the downward bending movement of the sheet and supporting it upon inclined surfaces, and in then completely severing the non-brittle material.

9. A device for use in cutting glass, comprising a support for the glass, a heating coil for disposition between the glass to be cut and the support, guide members engaging said coil and operable transversely of said support, and means for positioning said guide members relative to one another whereby said coil may be adjusted to assume a predetermined arc.

10. A device for use in cutting glass, comprising a support for the glass, a heating coil positioned to heat the glass along the line of cut, and a plurality of guide members engaging the coil and movable relative to one another transversely of said support whereby said coil may be adjusted to assume a predetermined arc.

11. The method of cutting laminated sheets of glass including two sheets of glass and an interposed sheet of non-brittle material, which consists in first scoring the glass sheets, breaking said sheets along the score lines, supporting the laminated sheet in a predetermined position by fixedly securing that portion of the sheet at one side only of the score lines, while leaving that portion of the said sheet at the opposite side of said score lines unsupported, in so positioning the laminated sheet that the unsupported portion thereof may be acted upon by gravity, in heating the laminated sheet to cause a softening of the non-brittle material so that the unsupported portion of the sheet will bend downwardly by its own weight to provide a gap between the glass at the score lines, and in then completely severing the non-brittle material.

12. In apparatus for use in the cutting of laminated sheets of glass, a plurality of supporting members, each having a substantially flat main supporting surface and an inclined auxiliary supporting surface extending at an angle relative thereto, means carried by said supporting members and adapted to engage the laminated sheet at one side only of the score lines subsequent to the scoring and breaking of the glass sheets for securing that portion of the laminated sheet in a fixed position upon said main supporting surfaces, that portion of the sheet at the opposite side of the score lines being unsecured and disposed opposite said auxiliary supporting surfaces, and means for heating the laminated sheet to cause the unsecured portion of said sheet to bend downwardly and engage the said auxiliary supporting surfaces.

CONRAD B. SCHAFER.